US011897366B2

(12) United States Patent
Rotilli Filho et al.

(10) Patent No.: US 11,897,366 B2
(45) Date of Patent: Feb. 13, 2024

(54) METHODS AND APPARATUSES FOR CONTROLLING AN ELECTRIC VEHICLE

(71) Applicant: ACCELERATED SYSTEMS INC., Waterloo (CA)

(72) Inventors: Silvio Rotilli Filho, Hamilton (CA); Tim Lambert, Los Angeles, CA (US); Muhammad Ikhlas, Waterloo (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 646 days.

(21) Appl. No.: 16/574,165

(22) Filed: Sep. 18, 2019

(65) Prior Publication Data

US 2020/0094683 A1    Mar. 26, 2020

Related U.S. Application Data

(60) Provisional application No. 62/837,476, filed on Apr. 23, 2019, provisional application No. 62/734,321, filed on Sep. 21, 2018.

(51) Int. Cl.
*B60L 7/18* (2006.01)
*B60W 30/18* (2012.01)
*B60L 7/26* (2006.01)

(52) U.S. Cl.
CPC ...... *B60L 7/18* (2013.01); *B60L 7/26* (2013.01); *B60W 30/18127* (2013.01); *B60W 2520/105* (2013.01)

(58) Field of Classification Search
CPC ....... B60L 7/18; B60L 7/26; B60W 30/18127; B60W 2520/105
See application file for complete search history.

(56) References Cited

U.S. PATENT DOCUMENTS

| | | | | |
|---|---|---|---|---|
| 9,821,662 B2* | 11/2017 | Nada | ............. | B60L 7/26 |
| 9,902,272 B2* | 2/2018 | Sawada | ............. | B60L 15/20 |
| 10,421,361 B2* | 9/2019 | Cho | ............. | B60L 7/18 |
| 2011/0015812 A1* | 1/2011 | Vogel | ............. | B60W 30/143 |
| | | | | 701/22 |
| 2013/0162009 A1* | 6/2013 | Mitts | ............. | B60L 7/26 |
| | | | | 303/3 |
| 2013/0268162 A1* | 10/2013 | Ponziani | ............. | B60L 50/61 |
| | | | | 701/99 |
| 2015/0019058 A1* | 1/2015 | Georgiev | ............. | B60L 58/12 |
| | | | | 701/22 |
| 2015/0222209 A1* | 8/2015 | Crisp | ............. | B60W 30/18127 |
| | | | | 318/376 |

(Continued)

FOREIGN PATENT DOCUMENTS

WO   WO-2013146175 A1 * 10/2013   ............. B60K 6/48

*Primary Examiner* — Amelia Vorce
(74) *Attorney, Agent, or Firm* — NYSSA INC.

(57) ABSTRACT

There is provided a method for controlling an electric vehicle. The method includes receiving a regenerative braking activation indicator. If the regenerative braking activation indicator is affirmative, the method includes applying regenerative braking at an initial level to an electric motor of the electric vehicle. The method also includes obtaining a vehicle motion parameter of the electric vehicle measured when the regenerative braking is being applied. In addition, the method includes changing the regenerative braking to a modified level based on the vehicle motion parameter.

10 Claims, 11 Drawing Sheets

(56) References Cited

U.S. PATENT DOCUMENTS

| | | | |
|---|---|---|---|
| 2016/0137068 A1* | 5/2016 | Nada | B60T 8/172 |
| | | | 701/70 |
| 2016/0280074 A1* | 9/2016 | Liang | B60L 15/2054 |
| 2016/0297303 A1* | 10/2016 | Sawada | B60L 3/08 |
| 2016/0318501 A1* | 11/2016 | Oldridge | B60W 20/12 |
| 2017/0015202 A1* | 1/2017 | Bryan | B60K 6/445 |
| 2017/0087992 A1* | 3/2017 | Murase | B60L 7/18 |
| 2017/0113675 A1* | 4/2017 | Oguri | B60K 6/445 |
| 2018/0079418 A1* | 3/2018 | Iwasa | B60W 10/107 |
| 2018/0086209 A1* | 3/2018 | Jeon | B60T 1/10 |
| 2018/0093571 A1* | 4/2018 | Hall | B60L 7/18 |
| 2018/0093572 A1* | 4/2018 | Hall | B60T 8/245 |
| 2018/0244258 A1* | 8/2018 | Mouri | B60W 10/08 |
| 2019/0193567 A1* | 6/2019 | Lee | B60T 7/042 |
| 2020/0055402 A1* | 2/2020 | Camhi | B60W 30/18127 |

\* cited by examiner

METHODS AND APPARATUSES FOR CONTROLLING AN ELECTRIC VEHICLE

CROSS-REFERENCE TO RELATED APPLICATION

This application claims the benefit of and priority from U.S. Provisional Patent Application No. 62/734,321, filed on Sep. 21, 2018, which is incorporated herein by reference in its entirety.

This application also claims the benefit of and priority from U.S. Provisional Patent Application No. 62/837,476, filed on Apr. 23, 2019, which is incorporated herein by reference it its entirety.

FIELD

The present specification relates to methods and apparatuses for controlling an electric vehicle, and in particular to methods and apparatuses for controlling an electric vehicle using regenerative braking.

BACKGROUND

Different sources of motive power may be used to propel vehicles. Examples of such sources include electric motors and internal combustion engines. Vehicles that use an electric motor for propulsion may be referred to as electric vehicles. In electric vehicles, regenerative braking may be used to control the motion of the vehicle.

SUMMARY

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a method for controlling an electric vehicle, the method comprising: receiving a regenerative braking activation indicator, if the regenerative braking activation indicator is affirmative, applying regenerative braking at an initial level to an electric motor of the electric vehicle; obtaining a vehicle motion parameter of the electric vehicle measured when the regenerative braking is being applied; and changing the regenerative braking to a modified level based on the vehicle motion parameter.

The vehicle motion parameter may comprise an acceleration of the electric vehicle; the obtaining the vehicle motion parameter may comprise obtaining the acceleration; and the changing the regenerative braking may comprise setting the modified level to be greater than the initial level if the acceleration is greater than an acceleration threshold.

The method may further comprise: obtaining the acceleration when the regenerative braking is being applied at the modified level; and if the acceleration is greater than the acceleration threshold, changing the regenerative braking to a further modified level being greater than the modified level.

The method may further comprise: if the acceleration is equal to or less than the acceleration threshold, changing the regenerative braking to the initial level.

The vehicle motion parameter may comprise a roll back indicator of the electric vehicle; the obtaining the vehicle motion parameter may comprise obtaining the roll back indicator; and the changing the regenerative braking may comprise setting the modified level to a maximum regenerative braking level if the roll back indicator is affirmative.

The vehicle motion parameter may comprise a traction loss indicator of the electric vehicle; the obtaining the vehicle motion parameter may comprise obtaining the traction loss indicator, and the changing the regenerative braking may comprise setting the modified level to be less than the initial level if the traction loss indicator is affirmative.

The obtaining the traction loss indicator may comprise: obtaining a rotational speed of a rotor of the electric motor; setting the traction loss indictor to affirmative if the rotational speed is at or below a threshold speed; and setting the traction loss indictor to negative if the rotational speed is above the threshold speed.

The setting the modified level to be less than the initial level may comprise setting the modified level to zero by disabling the regenerative braking.

The method may further comprise: obtaining the traction loss indicator when the regenerative braking is being applied at the modified level; and if the traction loss indicator is negative, changing the regenerative braking to a further modified level being greater than the modified level.

The method may further comprise: receiving from a sensor a vehicle environment parameter of the electric vehicle; and changing the regenerative braking to the modified level based further on the vehicle environment parameter.

The method may further comprise: receiving a mechanical braking parameter of the electric vehicle; and one or more of: changing the regenerative braking to the modified level based further on the mechanical braking parameter; and changing a mechanical braking level of the electric vehicle based on the changing the regenerative braking to the modified level.

Another aspect of the present specification provides a controller for controlling an electric vehicle, the controller comprising: a memory to store instructions executable by a processor, and the processor in communication with the memory. The processor may be to: receive a regenerative braking activation indicator, if the regenerative braking activation indicator is affirmative, apply regenerative braking at an initial level to an electric motor of the electric vehicle; obtain a vehicle motion parameter of the electric vehicle measured when the regenerative braking is being applied; and change the regenerative braking to a modified level based on the vehicle motion parameter.

The vehicle motion parameter may comprise an acceleration of the electric vehicle; to obtain the vehicle motion parameter the processor may be to obtain the acceleration; and to change the regenerative braking the processor may be to set the modified level to be greater than the initial level if the acceleration is greater than an acceleration threshold.

The processor may be further to: obtain the acceleration when the regenerative braking is being applied at the modified level; and if the acceleration is greater than the acceleration threshold, change the regenerative braking to a further modified level being greater than the modified level.

The processor may be further to: if the acceleration is equal to or less than the acceleration threshold, change the regenerative braking to the initial level.

The vehicle motion parameter may comprise a roll back indicator of the electric vehicle; to obtain the vehicle motion parameter the processor may be to obtain the roll back indicator, and to change the regenerative braking the processor may be to set the modified level to a maximum regenerative braking level if the roll back indicator is affirmative.

The vehicle motion parameter may comprise a traction loss indicator of the electric vehicle; to obtain the vehicle motion parameter the processor may be to obtain the traction loss indicator, and to change the regenerative braking the processor may be to set the modified level to be less than the initial level if the traction loss indicator is affirmative.

To obtain the traction loss indicator the processor may be to: obtain a rotational speed of a rotor of the electric motor; set the traction loss indictor to affirmative if the rotational speed is at or below a threshold speed; and set the traction loss indictor to negative if the rotational speed is above the threshold speed.

To set the modified level to be less than the initial level the processor may be to set the modified level to zero by disabling the regenerative braking.

The processor may be further to: obtain the traction loss indicator when the regenerative braking is being applied at the modified level; and if the traction loss indicator is negative, change the regenerative braking to a further modified level being greater than the modified level.

The processor may be further to: receive from a sensor a vehicle environment parameter of the electric vehicle; and change the regenerative braking to the modified level based further on the vehicle environment parameter.

The processor may be further to: receive a mechanical braking parameter of the electric vehicle; and one or more of: change the regenerative braking to the modified level based further on the mechanical braking parameter, and change a mechanical braking level of the electric vehicle based on the change of the regenerative braking to the modified level.

BRIEF DESCRIPTION OF THE DRAWINGS

Some example implementations of the present specification will now be described with reference to the attached Figures, wherein.

DETAILED DESCRIPTION

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. In addition, the headings and Abstract of the Disclosure provided herein are for convenience only and do not interpret the scope or meaning of the implementations.

In regenerative braking, the electric motor is used as a current generator to convert the kinetic energy of the vehicle back into a regenerative electric current. This regenerative current is then directed and stored into the batteries of the electric vehicle. In some examples, the maximum level of regenerative braking may be dictated by the maximum amount of regenerative current that the batteries accept. In addition, regenerative braking is not effective at very low or zero rotational speeds of the electric motor. As such, while regenerative braking may be used to slow down an electric vehicle, regenerative braking may be less effective or ineffective at bringing the vehicle to a complete stop.

Figure 1:
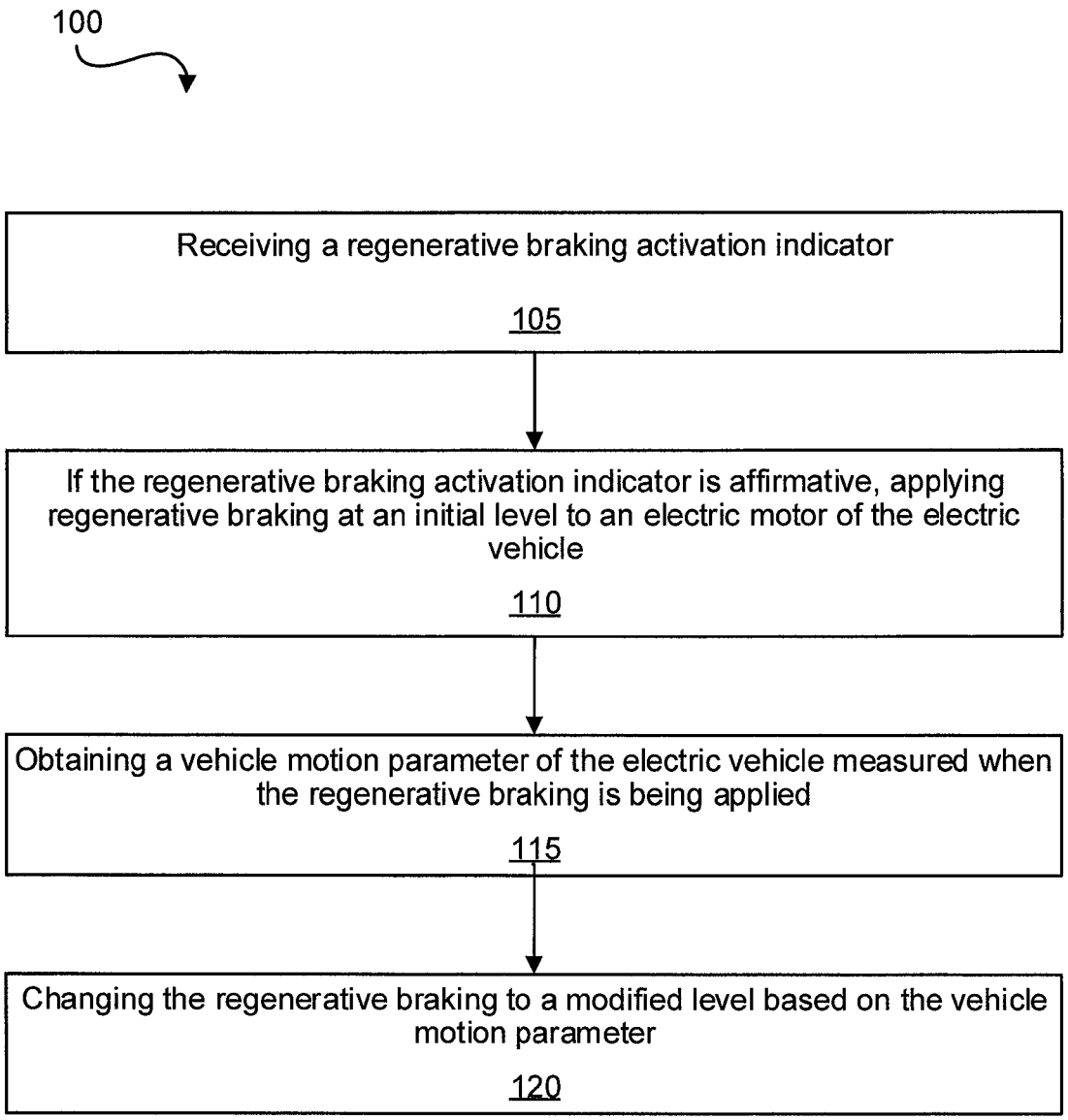
FIG. 1 shows a flowchart of an example method which may be used for controlling an electric vehicle, in accordance with a non-limiting implementation of the present specification.

In electric vehicles, an initial level of regenerative braking may be selected. In some examples, this initial level may be a vehicle preset, may be selected by the vehicle operator, may be selected by a manager or operator of a fleet of electric vehicles, and the like. Moreover, in some examples, the level of regenerative braking applied may be changed while the regenerative braking is being applied, in order to enhance the safe operation of the electric vehicle or to provide the vehicle operator with a more consistent vehicle feel or behavior. FIG. 1 shows a flowchart of an example method 100, which may be used for controlling an electric vehicle.

In this description, "electric vehicle" may also be referred to as "vehicle", in short form. In addition, "regen" may be used as a short form for "regenerative" in phrases such as "regenerative braking" and the like.

At box 105 of method 100, a regenerative braking activation indicator may be received. In some examples, this regenerative braking activation indicator may be based on the throttle input. For example, if the throttle input is non-zero, the regen braking activation indicator may be set to negative, and if the throttle-input is zero, then the regen braking activation indicator may be set to affirmative. In other words, in such examples the regen braking activation indicator may be affirmative when the operator lets off the throttle, and negative otherwise. Furthermore, it is contemplated that in some examples the regen braking activation indicator may be based on inputs or parameters in addition to or other than the throttle input.

At box 110, regenerative braking may be applied at an initial level to an electric motor of the electric vehicle, if the regen braking activation indicator is affirmative. In examples where the regen braking activation indicator is based on the throttle input, the regen braking may be applied at the initial level once the operator lets off the throttle. In some examples, this initial level may represent a default, pre-set, or operator-set level of regen braking.

Turning now to box 115, a vehicle motion parameter of the electric vehicle may be obtained, which vehicle motion parameter is measured when the regen braking is being applied at the initial level. In some examples, the vehicle motion parameter may comprise an acceleration of the electric vehicle, a roll back indicator of the electric vehicle, a traction loss indicator of the electric vehicle, and the like. Such examples are discussed in greater detail below. In some examples, obtaining the vehicle motion parameter may comprise one or more of receiving the vehicle motion parameter, retrieving the vehicle motion parameter, sensing the vehicle motion parameter, measuring the vehicle motion parameter, calculating the vehicle motion parameter, and the like.

At box 120, in turn, the regenerative braking may be changed to a modified level based on the vehicle motion parameter. The modified level may be higher or lower than the initial level. In other words, in response to the vehicle motion parameter, the level of regen braking may be increased or decreased relative to the initial level. As such, the regen braking may be described as being adaptive, as the level of regen braking may change in response to the vehicle motion parameter.

In some examples, the vehicle motion parameter may comprise acceleration of the electric vehicle. In such examples, obtaining the vehicle motion parameter may comprise obtaining the acceleration of the vehicle. In some examples, obtaining the acceleration may comprise calculating the acceleration based on the changes to the rotational speed of the rotor of the electric motor over time. It is contemplated that in some examples acceleration may be obtained using methods other than those based on the rotational speed of the rotor. Changing the regenerative braking, in turn, may comprise setting the modified level of regen braking to be greater than the initial level if the acceleration is greater than an acceleration threshold.

Moreover, in some examples where the vehicle motion parameter comprises acceleration, the acceleration may also be obtained when the regenerative braking is being applied at the modified level. In such examples, the regenerative braking may be changed to a further modified level that is greater than the modified level, if the acceleration is greater than the acceleration threshold. Furthermore, in some examples, when the regen braking is applied at the further modified level, the regenerative braking may be changed back to the initial level if the acceleration becomes less than the acceleration threshold.

Figure 2:
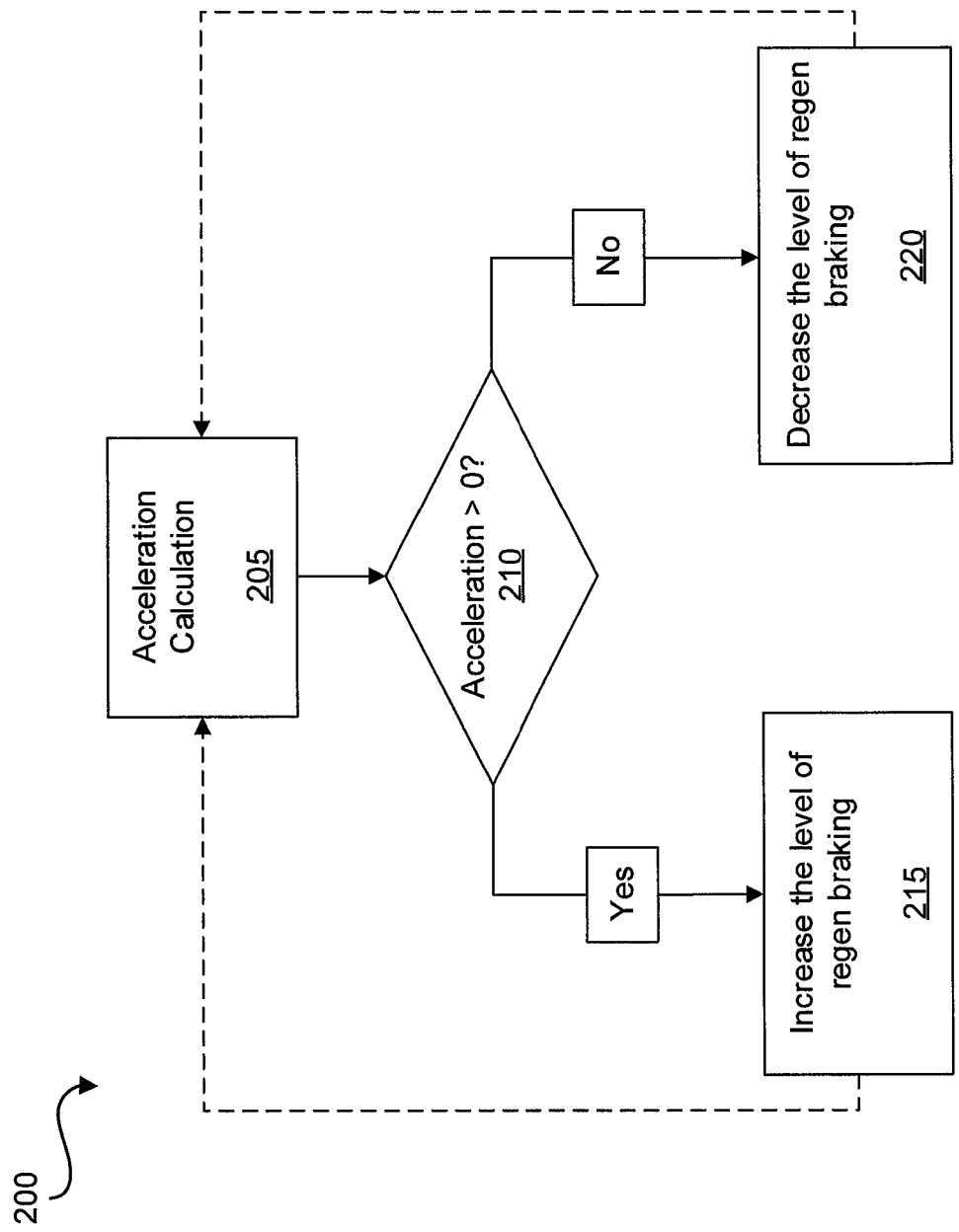
FIG. 2 shows a flowchart of an example method, which provides an example implementation of the method of FIG. 1, in accordance with a non-limiting implementation of the present specification.

FIG. 2 shows a flowchart of an example method 200, which provides an example implementation of method 100 where the vehicle motion parameter comprises the acceleration and the acceleration threshold is zero. At box 205, the acceleration of the vehicle is calculated when regen braking is being applied at the initial level. At box 210, a determination is made as to whether the acceleration exceeds the threshold, which in this example is set to zero. If the acceleration exceeds zero, the method moves to box 215, where the level of regen is increased in an effort to use regen braking to bring the acceleration down to or below the acceleration threshold.

If the determination at box 210 is negative, then the method moves to box 220 where the level of regen braking may be decreased. In some examples, the level of regen braking may be decreased back to the initial level. In some examples, once the level of regen braking is increased in box 215, the method may move back to box 205 for a recalculation of the acceleration and then to box 210 for a redetermination of whether the acceleration remains above the threshold. Based on whether this redetermination is affirmative or negative, the method may then move back to box 215 or 220 respectively. Similarly, in some examples, once the level of regen braking is decreased in box 220, the method may move back to box 205 for a recalculation of the acceleration and then to box 210 for a redetermination of whether the acceleration remains above the threshold. Based on whether this redetermination is affirmative or negative, the method may then move back to box 215 or 220 respectively. Moreover, in some examples method 200 may cycle through boxes 205, 210, and 215 until the acceleration is at or below the acceleration threshold. In some examples, after one or more cycles between boxes 205, 210, and 215, the regen braking level may be increased to about four times the initial level of regen braking.

Figure 3:
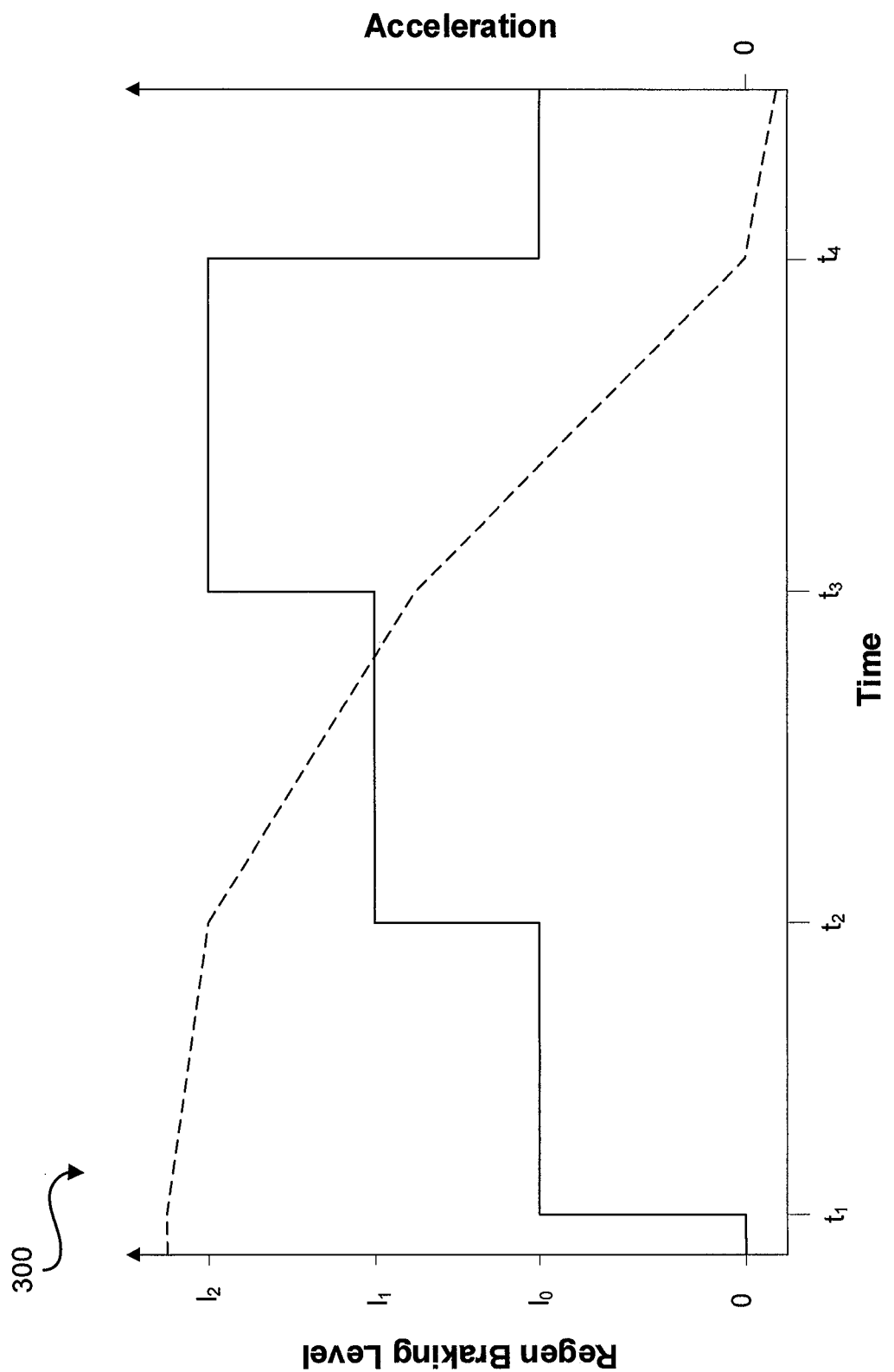
FIG. 3 shows an example graph of example regenerative braking level and acceleration profiles over time, in accordance with a non-limiting implementation of the present specification.

Turning now to FIG. 3, an example graph 300 is shown. Graph 300 shows example regen braking level and acceleration profiles over time. The regen braking level is shown in a solid line and the acceleration is shown in a dashed line. These profiles may be obtained upon applying method 200. At time $t_1$, an affirmative regen braking activation indicator is received, and regen braking is applied at the initial level $l_0$. Between $t_1$ and $t_2$, regen braking is applied at the initial level $l_0$, but the acceleration remains above the threshold, which in the example of graph 300 is set at zero.

As the acceleration remains above the zero threshold at $t_2$, the regen braking level is increased to a modified level of $l_1$. Between $t_2$ and $t_3$, regen braking is applied at the modified level $l_1$, but the acceleration continues to remain above the threshold, which in the example of graph 300 is set at zero. At $t_3$, the regen braking level is increased to a further modified level of $l_2$. The regen braking is applied to the further modified level of $l_2$ until at time $t_4$ acceleration is reduced to the threshold level of zero. Since acceleration is no longer above the zero threshold, at $t_4$ the regen braking level is reduced back to the initial level $l_0$.

While graph 300 shows the regen braking level being increased in a stepwise manner, it is contemplated that in some examples the regen braking level may be increased more gradually using smaller or narrower steps, or in a substantially continuous manner. The methods described in relation to FIGS. 1-3 may allow the regen braking to be adaptively modified to respond to the vehicle operating parameters. For example, if the vehicle is heavier than its typical operating weight or is traversing a downward slope, applying regen braking at the initial level may not produce the deceleration that the vehicle operator is accustomed to from past experiences operating the vehicle under more typical operating parameters. Adaptively increasing the regen braking level may provide the vehicle operator with a consistent regen braking experience, even though the vehicle may be heavier than usual or on a downward slope.

Furthermore, in some examples, once zero or substantially zero acceleration has been achieved, regen braking may be used to decrease the vehicle's speed to a reference speed dictated by the throttle input. For example, in the case of an accelerator pedal, how far the pedal is depressed by the vehicle operator may determine the throttle input.

Moreover, in some examples, the rate of reduction of the speed to the reference speed may be set based on a braking aggressiveness rate. In some examples, the braking aggressiveness rate may be a factory preset, may be set by the vehicle operator, may be set by a manager or operator of a fleet of vehicles, and the like. Furthermore, in some examples the braking aggressiveness rate may be expressed in RPM/sec. Moreover, in some examples, the reduction of speed to the reference speed may also be achieved by applying regenerative braking at a rate commensurate with the braking aggressiveness rate.

It is contemplated that in some examples the level of regen braking may be adaptively varied to substantially match the rate of deceleration of the vehicle dictated by the braking aggressiveness rate. For example, if the operating parameters of the vehicle (e.g. vehicle weight or terrain slope) tend to reduce the deceleration, the level of regen braking may be increased to compensate for the operating parameters and to more closely match the braking aggressiveness rate. In addition, in some examples, if the vehicle operator is not applying sufficient levels of mechanical braking to achieve the braking aggressiveness rate when the mechanical braking is combined with the initial level of regen braking, the level of regen braking may be adaptively increased to compensate for the lower mechanical braking level.

Furthermore, in some examples, the maximum level of regen braking may not be sufficient to achieve the given braking aggressiveness rate when combined with the mechanical braking applied by the operator, under the vehicle's operating conditions. In such examples, the level of mechanical braking may be increased to achieve the given braking aggressiveness rate when the mechanical braking is combined with the maximum level of regenerative braking.

Moreover, in some examples the operator may be applying an excess of mechanical braking when the braking aggressiveness rate may be achievable using largely or exclusivity regen braking. Regen braking may be more efficient than mechanical braking, as regen braking may recapture some of the kinetic energy of the vehicle to recharge the vehicle's batteries. As such, in situations where the operator applies an excess of mechanical braking, in some examples the excess level of mechanical braking may be reduced and replaced by a commensurate increase the in the level of regen braking.

Furthermore, in some examples, the balance between mechanical and regen braking may be adjusted based on the rotational speed of the electric motor of the electric vehicle. As regen braking becomes less effective or ineffective at sufficiently low rotational speeds, the balance of the regen and mechanical braking may be adjusted to reduce the regen braking as the speeds decrease. This reduction may signal to the operator to start applying more mechanical braking to maintain the braking aggressiveness rate into low speeds. In some examples, as the regen braking is reduced with the reduction in motor rotational speeds, more mechanical braking may be applied to compensate for the reduction in the regen braking and to maintain the braking aggressiveness rate.

In some examples, the changes in the rotational speed of the electric motor may be calculated using a moving average filter using thirty two (32) samples of speed as shown in equation 1.

$$\text{rate of change of speed} = \frac{\left(\sum_{i=16}^{32} \text{motor speed}(i)\right)}{16} - \frac{\left(\sum_{i=1}^{16} \text{motor speed}(i)\right)}{16} \qquad \text{Eq. 1}$$

In addition, in some examples the vehicle motion parameter may comprise a roll back indicator of the electric vehicle. In such examples, obtaining the vehicle motion parameter may comprise obtaining the roll back indicator. Obtaining the roll back indicator may comprise one or more of receiving the roll back indicator, retrieving the roll back indicator, sensing the roll back indicator, measuring the roll back indicator, calculating the roll back indicator, and the like. In some examples, rolling back may correspond to the rotor of the electric motor of the vehicle rotating in a direction opposite the direction indicated by the vehicle operational inputs provided to the vehicle by its operator. In some examples, roll back may occur if the operator lets off the throttle on a steep upward slope, whereupon gravity causes the vehicle to begin to roll backwards down the slope. The roll back indicator may be set to affirmative if roll back is occurring, and to negative otherwise.

In some of the examples where the vehicle motion parameter comprises the roll back indicator, changing the regenerative braking may comprise setting the modified level to a maximum regenerative braking level if the roll back indicator is affirmative. In other words, when it is detected that the vehicle is rolling back when the regenerative braking is being applied at the initial level, the regenerative braking may be increased to the maximum regen braking level to reduce or halt the roll back. This may increase the safety of operation of the vehicle by reducing the roll back and enhancing the ability of the vehicle operator to maintain control of the vehicle in a roll back situation.

Figure 4:
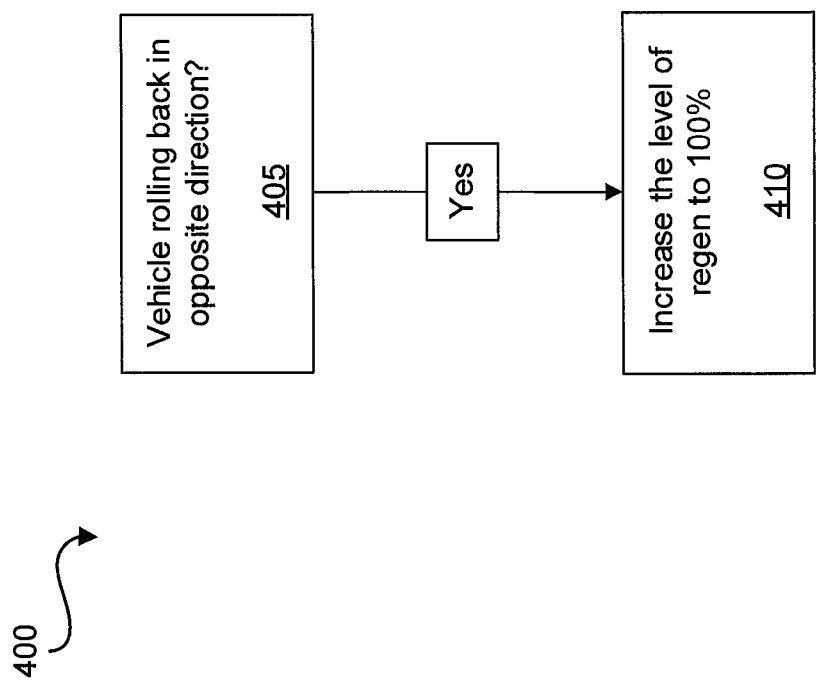
FIG. 4 shows a flowchart of another example method, which provides another example implementation of the method of FIG. 1, in accordance with a non-limiting implementation of the present specification.

FIG. 4 shows a flowchart of an example method 400, which provides an example implementation of method 100 where the vehicle motion parameter comprises the roll back indicator. At box 405, a determination may be made as to whether the vehicle is rolling back in the opposite direction; i.e. whether the roll back indicator is affirmative. If this determination is affirmative, then method 400 moves to box 410 where the level of regen braking may be increased to 100%, i.e. the maximum regen braking level, to slow down to halt the roll back.

It is also contemplated that in some examples, upon detection of roll back, the regen braking level may be increased to a modified level which is greater than the initial level but less than the maximum regen braking level. Moreover, in some examples where increasing the regen braking to maximum may not be sufficient to halt the roll back, some level of mechanical braking may also be triggered to cooperate with the regen braking to further reduce or halt the roll back.

In addition, in some examples the vehicle motion parameter may comprise a traction loss indicator of the electric vehicle. In such examples, obtaining the vehicle motion parameter may comprise obtaining the traction loss indicator. In some examples, obtaining the traction loss indicator may comprise one or more of receiving the traction loss indicator, retrieving the traction loss indicator, sensing the traction loss indicator, measuring the traction loss indicator, calculating the traction loss indicator, and the like. In examples where obtaining the vehicle motion parameter comprises obtaining the traction loss indicator, changing the regenerative braking may comprise setting the modified level of regen braking to be less than the initial level, if the traction loss indicator is affirmative. This adaptive changes to the regen braking levels based on whether traction loss has occurred may also be referred to anti-lock regenerative braking.

Moreover, in some examples, obtaining the traction loss indicator may comprise obtaining a rotational speed of a rotor of the electric motor, and setting the traction loss indictor to affirmative if the rotational speed is at or below a threshold speed, and setting the traction loss indictor to negative if the rotational speed is above the threshold speed. In such examples, the rotational speed of the rotor is used as a proxy for the rotational speed of the wheel of the electric vehicle. In addition, this rotational speed being below the threshold is used as a proxy for or an indication of a reduction in or loss of traction.

As discussed above, regen braking becomes less effective at low motor speeds. As such, regen braking alone may not be able to reduce the rotational speed below the threshold speed. In some examples, a determination that the rotational speed of the rotor (and by proxy rotational speed of the wheel coupled to the corresponding motor) is below the speed threshold achievable by regen braking may be used an indication that the wheel has lost traction or has locked.

Figure 5:
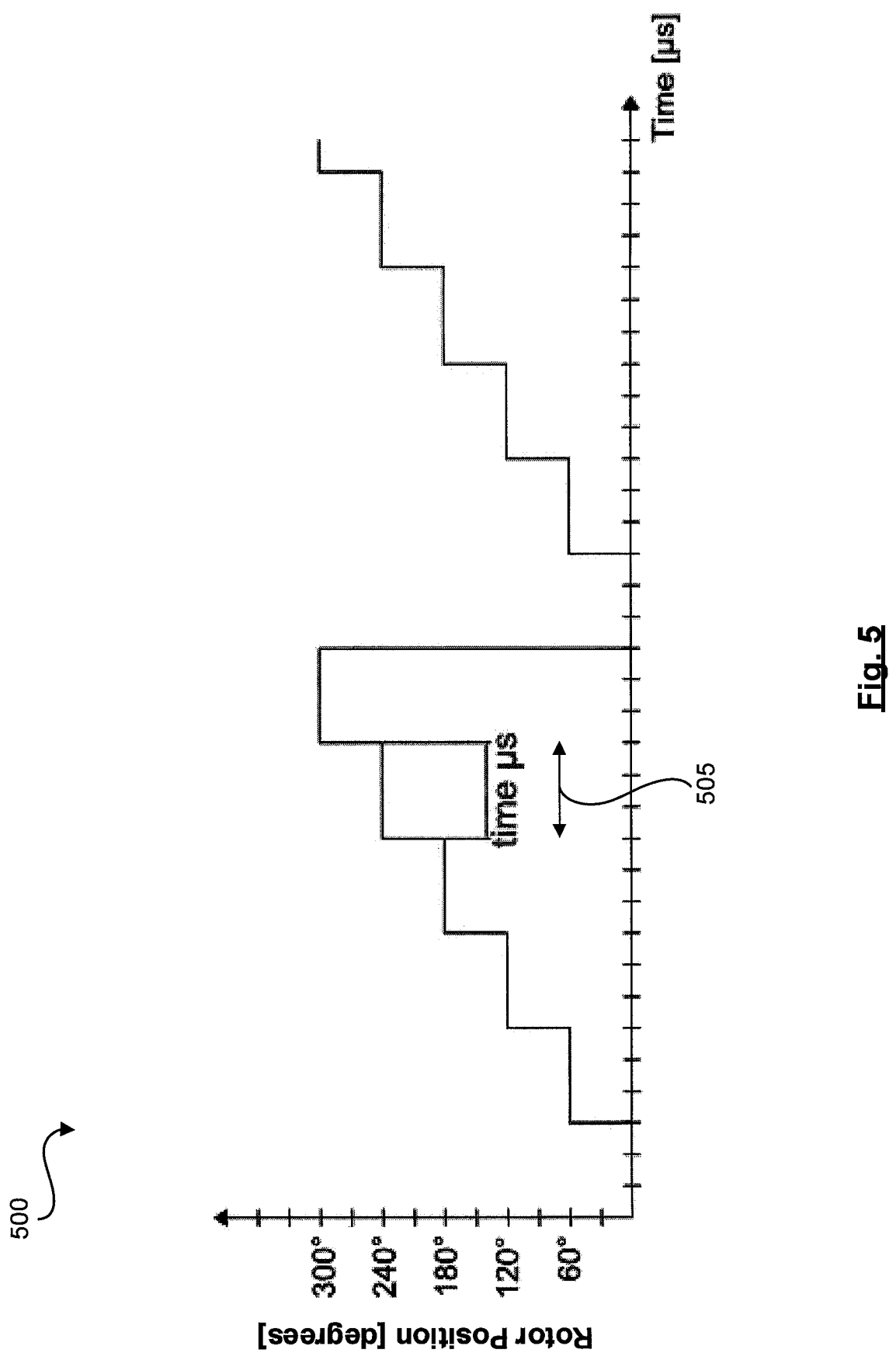
FIG. 5 shows an example graph of example Hall transitions of an example Hall sensor in an electric motor, in accordance with a non-limiting implementation of the present specification.

In some examples, output from a Hall sensor in the electric motor may be used to determine the rotational speed of the rotor. In some examples, the use of raw Hall sensor data, with relatively few or no intervening filters, may allow for rapid sensing of traction loss. This rapid sensing may in turn allow for timely modification of the regen braking level in response to the traction loss. FIG. 5 shows an example graph 500 of example Hall transitions of an example Hall sensor in an electric motor. By measuring or monitoring the amount of time between successive Hall transitions, an indication of the rotational speed of the rotor may be obtained. Time duration 505 is an example of such a time duration between successive Hall transitions.

If the time duration of a given Hall transition becomes long enough to correspond to a rotor rotational speed less than the speed threshold, the regen braking may be changed to a modified level that is lower than the initial level. In other words, if the traction loss indictor is affirmative as indicated by the rotational speed being at or below the threshold, the level of regen braking may be reduced to allow the motor (and the wheel coupled thereto) to rotate more freely and potentially regain traction. In some examples, when the traction loss indicator is affirmative, the regen braking may be disabled and the regen braking level may be set to zero.

Once the next Hall transition is reached, the time counter may be reset, and the time duration to the following Hall transition may then be tracked. If time duration to reach the following Hall transition is short enough to establish a rotational speed above the speed threshold, the regen braking level may be increased. In other words, in some examples the traction loss indicator may be obtained when the regenerative braking is being applied at the modified level. If the traction loss indicator is negative, the regenerative braking may be changed to a further modified level that is greater than the modified level.

Furthermore, in some examples, the modified level of regen braking may be gradually or incrementally increased for consecutive Hall transitions while the rotational speed remains above the threshold. If these increases cause the traction loss indictor to become affirmative again, the level of regen braking may be reduced to the highest level which allows the traction loss indicator to remain negative. This is shown in FIG. 6, which depicts an example graph 600 of example regen braking level and traction loss indicator profiles over time.

Figure 6:
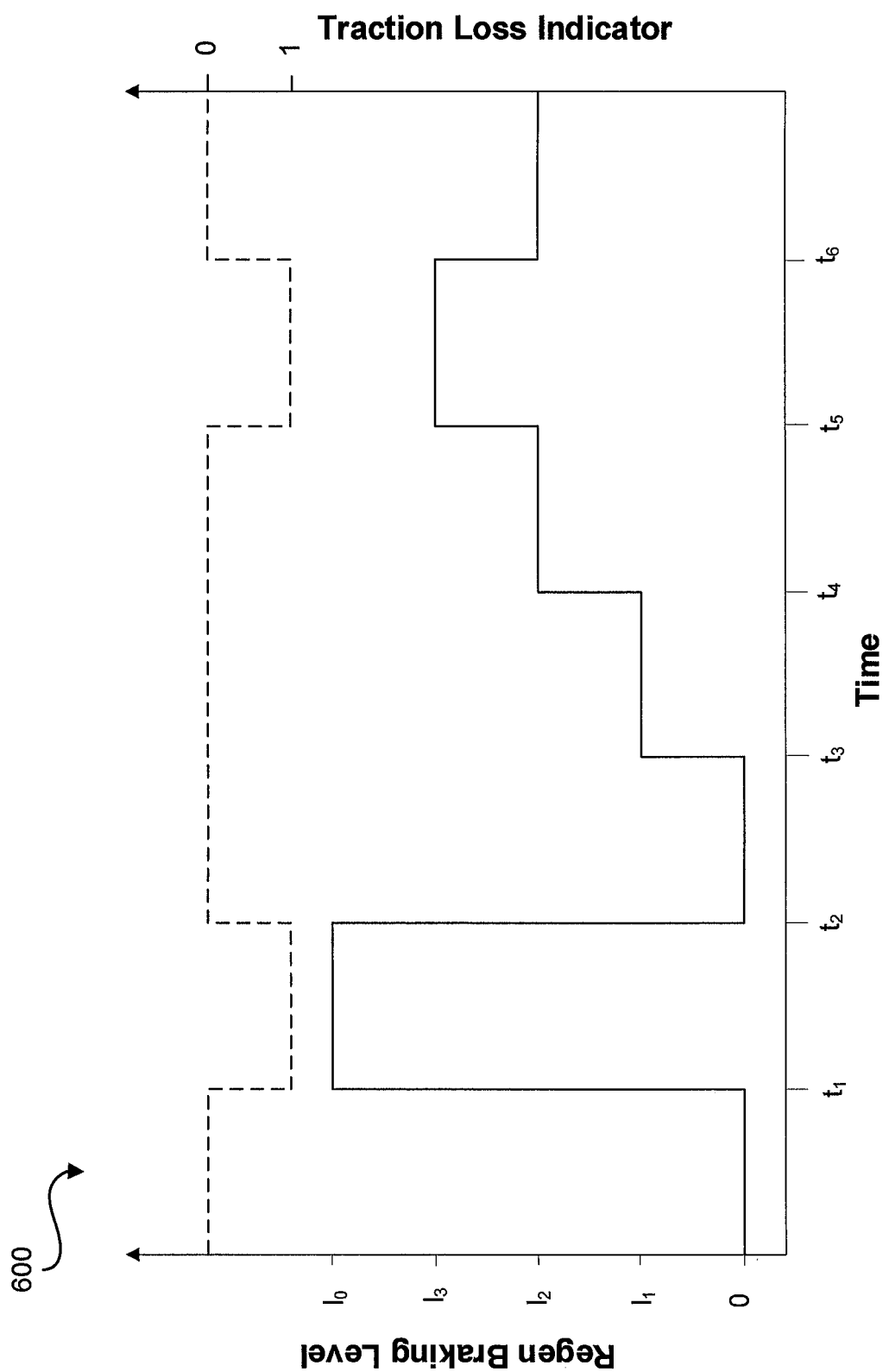
FIG. 6 shows an example graph of example regen braking level and traction loss indicator profiles over time, in accordance with a non-limiting implementation of the present specification.

In FIG. 6, the solid line shows the level of regen braking and the dashed line shows the traction loss indicator. A value of zero for the traction loss indicator corresponds to a negative traction loss indicator, and a value of one corresponds to an affirmative traction loss indicator. At time $t_1$ an affirmative regen braking indicator may be received, whereby the regen braking level is set to an initial level $l_0$. In slippery conditions, activation of regen braking may cause traction loss wherein the traction loss indicator may become affirmative.

In response to the traction loss indictor becoming affirmative, the regen braking level may be reduced to zero at $t_2$, which may allow the wheel/vehicle to regain traction and for the traction loss indicator to return to negative. Between $t_3$ and $t_5$, the regen braking level may be gradually increased from zero at $t_2$, to $l_1$ at $t_3$, to $l_2$ at $t_4$, and then to $l_3$ and $t_5$. Increasing the level of regen braking to $l_3$ may again trigger a loss in traction. In response to this loss in traction, the level of regen braking may be reduced by to $l_2$. $l_2$, in turn, may represent the highest level of regen braking that does not cause a loss of traction.

It is contemplated that in some examples the increases or decreases in the level of regen braking may be in shorter or smaller steps than those shown in FIG. 6, or may be substantially continuous. It is also contemplated that in some examples, upon traction loss, the level of regen braking may be decreased gradually while monitoring the traction loss indicator, to find the highest level of regen braking at which traction is regained. In addition, in some examples, when regen braking is reduced or disabled upon the loss of traction, mechanical braking applied by the vehicle operator may also be reduced or disabled.

In some examples, as between the regen and mechanical braking, the mechanical braking may be reduced or disabled first upon a loss of traction, and increased or reenabled last upon traction being regained. This in turn may increase the amount of regen braking (as between mechanical and regen braking) that may be applied when there is a risk of loss of traction, thereby increasing the portion of the vehicle's kinetic energy which may be recaptured by regen braking to recharge the batteries.

In addition, in some examples a vehicle environment parameter of the electric vehicle may be received from a sensor, and the regenerative braking may be changed to the modified level based further on the vehicle environment parameter. In some examples, the environment parameter may comprise a terrain wetness parameter, a terrain incline parameter, and the like. In some examples, the terrain wetness parameter may be sensed by water or wetness sensors disposed on or proximate the windshield or windshield wipers of the electric vehicle. Moreover, in some examples the terrain incline parameter may be sensed by incline sensors, which sensors may comprise gyroscopes, and the like.

In some examples, when the terrain wetness parameter indicates a possibility of the terrain being wet and thus potentially more slippery, the level of regen braking may be reduced to decrease the likelihood of traction loss as a result of applying regen braking on the slippery terrain. Similarly, in some examples, when the terrain incline parameter indicates that the vehicle is traversing a steep incline, the level of regen braking may be increased to counteract the impact of gravity and provide a consistent braking or deceleration rate. Moreover, in some examples where the terrain is both wet/slippery and steep, the level of regen braking may be adjusted to provide the highest possible level of regen braking without causing the vehicle to lose traction.

Furthermore, in some examples a mechanical braking parameter of the electric vehicle may also be received. The mechanical braking parameter may provide an indication of the level of mechanical braking being applied by the vehicle operator. In such examples, the regenerative braking may be changed to the modified level based further on the mechanical braking parameter. For example, in situations where the initial level of regen braking is to be increased in order to counteract the effects of a steep incline or increased vehicle weight, the increase to the initial level of regen braking may be smaller as the mechanical braking may be providing some of braking needed to counteract the effect of terrain slope and vehicle weight.

Similarly, in situations where the initial level of regen braking is to be decreased in order to avoid traction loss, the decrease to the initial level of regen braking may be larger if mechanical braking is already providing a baseline of braking to the vehicle. Moreover, in some examples a mechanical braking level of the electric vehicle may be changed based on changing the regenerative braking to the modified level. For example, if the regen braking is being disabled to reduce the likelihood of traction loss, the mechanical braking may also be reduced or disabled. Furthermore, if the regen braking is being increased to counteract the effects of terrain slope, vehicle weight, or to counteract roll back, the mechanical braking may also be increased to supplement the regen braking. It is contemplated that in some examples the changes to the mechanical braking level discussed herein may be automatic or completed with minimal or no input from the vehicle operator.

In some examples, if the operator is applying mechanical braking at the same time as regenerative braking is being applied, the level of mechanical braking may be reduced during the same time periods when the level of regen braking is being reduced to prevent the loss of traction.

Moreover, in some examples a threshold of about 10% of the motor rated speed may be used to enable or disable the anti-lock regen braking when the vehicle is running in the same direction as the setting hardware switch, and about 5% when the vehicle is rolling in the opposite direction. The 10% and 5% values are examples, and it is contemplated that other values may also be used. To calculate the electric period, Eq. 2 may be used. The time between successive Hall transitions may be measured, and the period may be calculated in every transition.

$$\text{electric period} = \frac{1}{rated_{rpm} * \frac{speed_{threshold}\,(PU)}{60} * \text{pole pair} * \text{number hall transition}} \quad \text{Eq. 2}$$

For an example 8-pole pair motor, rated speed of 3000 RPM and speed threshold of 10% (0.1), the electric period may be calculated as follows:

$$\text{electric period} = \frac{1}{rated_{rpm} * \frac{0.1}{60} * \text{pole pair} * 6} = \frac{100}{rated_{rpm} * \text{pole pair}} = 0.004166 \text{ seconds}$$

For the example motor above, if the time between the Hall transitions is higher than 4.166 ms, the anti-lock regen braking may be activated to reduce or disable the regenerative braking. FIG. 5 shows example Hall transitions, as discussed above. The time counter may be reset after every Hall transition.

In some examples a regen braking ramp may be used to smooth the transition to full vehicle stop and to act as a safety feature reminding the vehicle operator to use the mechanical brake (blended braking technique) to completely stop the vehicle, since there is no regenerative braking at zero speed. To condition the braking behavior, in some examples a smooth ramp from a speed threshold may limit the amount of regen at low speeds. The amount of regenerative braking may be calculated using Eq. 3.

$$regen = \left(speed * \max \text{braking} * \frac{1}{(\text{start value} - \text{end value})}\right) - \max \text{braking} * \frac{\text{end value}}{\text{start value} - \text{end value}} \quad \text{Eq. 3}$$

For example, if the maximum braking torque is 25%, the vehicle speed is 0.2 PU, end value is 0.1 PU and start value is 0.5 PU, the amount of regenerative braking at this point will be 0.0625 PU. PU may stand for "per unit" or "percent unit", and may represent a factional unitless value relative to a reference value. For example, vehicle speed may be represented as 0.5 PU when vehicle speed is 25 km/h, and the reference speed is 50 km/h.

If the vehicle is moving in the same direction as the hardware direction switch, the calculation may use 0% of regen at 10% of motor speed (end value is 0.1 PU) and the start value changes with the maximum braking torque.

If the maximum braking torque is higher than 0.5 PU, the start value may be set to be about equal to the maximum braking torque. If the maximum braking torque is lower than 0.5 PU, the start value may be set to be equal to about 0.5 PU. This scheme may help to avoid wheel lock under high regenerative braking and improve the smoothness of braking in low speeds. This scheme is depicted in FIG. 7, which shows an example graph 700 of example levels of regen braking as a function of motor speed.

In some examples, when the vehicle is rolling in the opposite direction (i.e. roll back), the level of regenerative braking may be increased compared to the typical operation. For the opposite direction, the ramp may start at 0.3 PU and end at 0.05 PU.

Figure 7:
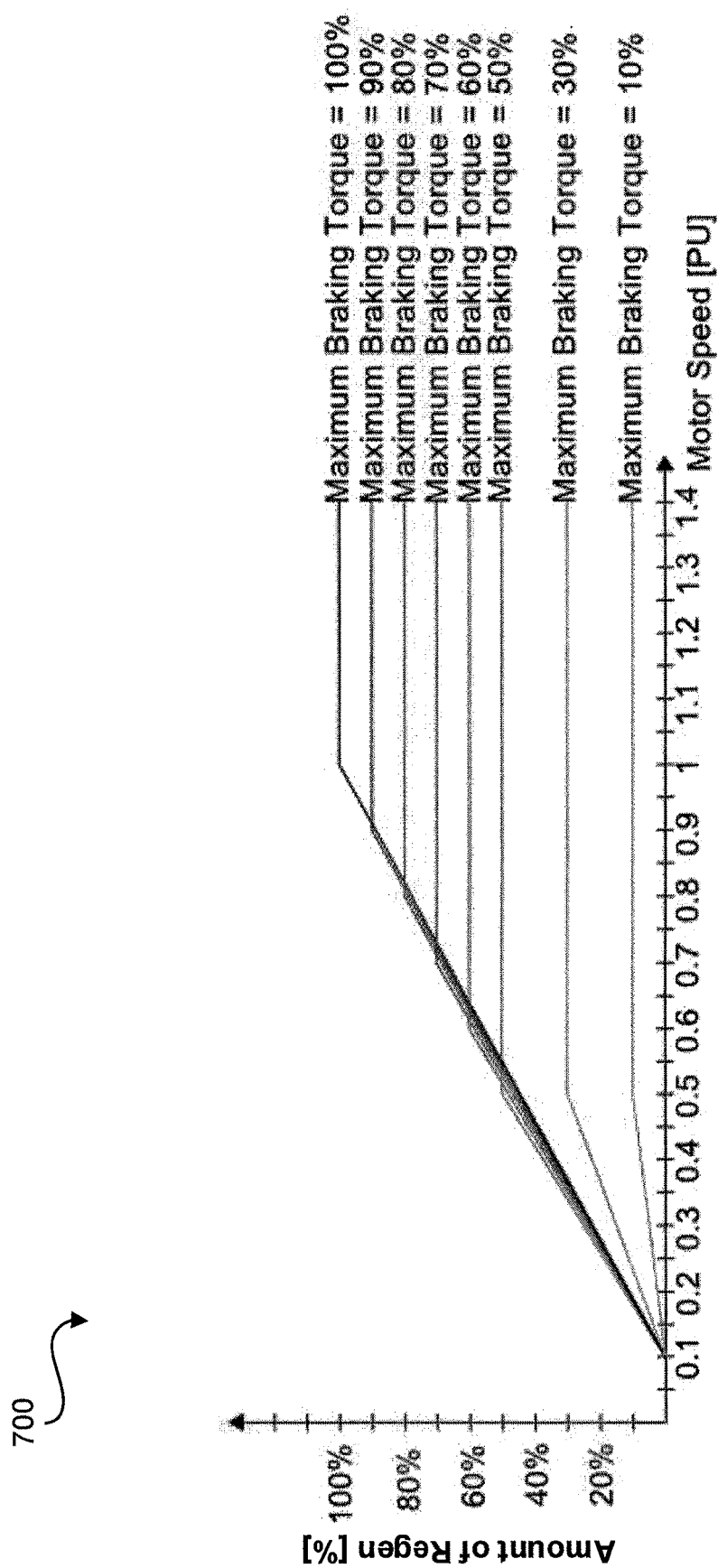
FIG. 7 shows an example graph of example levels of regenerative braking as a function of electric motor speed, in accordance with a non-limiting implementation of the present specification.

The regen level profiles, ramp thresholds, and ramp rates shown in FIG. 7 and described herein, and the related equations, are illustrative examples, and it is contemplated that other profiles, ramp thresholds, ramp rates, and equations may also be used.

In some examples, the vehicle operator may have elected not to have regenerative braking when the operator releases the throttle, and as such the operator may set the initial regenerative braking level to a very small value or to zero. In such examples, the operator my become accustomed to this level of deceleration and come to expect the vehicle to behave the same, i.e. with very little or no regenerative braking, regardless of the direction of motion of the vehicle. In some examples, in situations where the vehicle starts rolling in the opposite direction (e.g. rolling backwards down a slope) this roll back may be detected and regen braking may be applied or the level of regen braking may be increased to give the operator more control over the vehicle.

In some examples, if the operator sets the maximum braking torque (i.e. the maximum regen level) to a value lower than about 25%, during the opposite direction operation (i.e. roll back), the minimum amount of regenerative braking may be set to about 25%. In some examples, this feature may enhance safety. If the vehicle is moving up a hill and the vehicle starts rolling in the opposite direction, regenerative braking may be applied or increased to reduce the likelihood of the operator losing control of the vehicle. In some examples, for the opposite direction operation (i.e. roll back situations), the adaptive regenerative braking may be activated if the speed continues increasing, whereby the level of regen braking may be increased to 100% of regenerative braking so long as the acceleration remains above its threshold.

In addition, in some examples, the level of regenerative braking may be controlled by a deceleration ramp. In some examples, this deceleration ramp may be related to, similar to, or the same as the braking aggressiveness rate. It is also contemplated that in some examples the deceleration ramp may be different than the braking aggressiveness rate. The operator of the vehicle or the fleet may set a slope, for example about 1000 RPM/s, for the ramp. The level of regenerative braking may be controlled or adjusted so that the rotational speed of the electric motor follows the slope of this ramp. For the operator, the braking sensation may be maintained at a consistent level, and the operator need not manually set the braking amount. In this manner the braking sensation may be maintained even though the slope of the terrain or the weight of the vehicle may deviate from default or typical ranges (provided the highest level of regenerative braking needed for following the deceleration ramp does not exceed the maximum regen level).

In some examples, the operator may prefer to use a foot pedal or handle lever of the vehicle to control or enable the braking. The operator may become accustomed to the level of braking they may apply from the source. In such examples, if the conditions are met to disable the braking to prevent the loss of traction, the regen braking may also be reduced or disabled. This in turn may enhance the safety of operation of the vehicle.

It is contemplated that in some examples anti-lock regen braking may also be applied in sensorless motors. In examples where the motor does not comprise a Hall sensor, an external speed sensor may be used to monitor the vehicle speed. In some examples, such an external speed sensor may sense the rotational speed of the electric motor, or the rotational speed of a wheel (of the electric vehicle) that is mechanically coupled to the electric motor. The time taken between pulses from the speed sensor may be calculated in a manner similar to monitoring the time taken between successive Hall transitions at a certain speed. In some examples, the speed may be about 1 MPH. In some examples a different speed threshold may be used. Once it is determined that the time between the pulses from the external speed sensor is greater than the threshold defined for traction loss, regen braking may be disabled to reduce the likelihood of the vehicle losing traction.

For motors without Hall sensors or external speed sensors, the anti-lock regen braking may rely on the speed calculation using sensorless methods. Based on the speed calculation from sensorless methods, if it is determined that rotational speed of the motor indicates traction loss, the level of regen braking may be reduced. Some examples of sensorless control of electric motors are described in U.S. Provisional Patent Application No. 62/837,476, filed on Apr. 23, 2019, which is incorporated herein by reference it its entirety.

The anti-lock regen braking described herein may be applied to two-wheel vehicles such as ebikes, electric scooters, mopeds, and the like, as well as being applied to four-wheel vehicles. In some examples, in a scenario where a bike operator is going down a steep hill, high levels of regen braking may lock the front wheel and the operator may be thrown over the handlebars. Information from an incline sensor may be received and used to change the level of regen braking (e.g. by reducing the regen braking levels) to reduce the likelihood of the operator being thrown over the handlebars.

Figure 8:
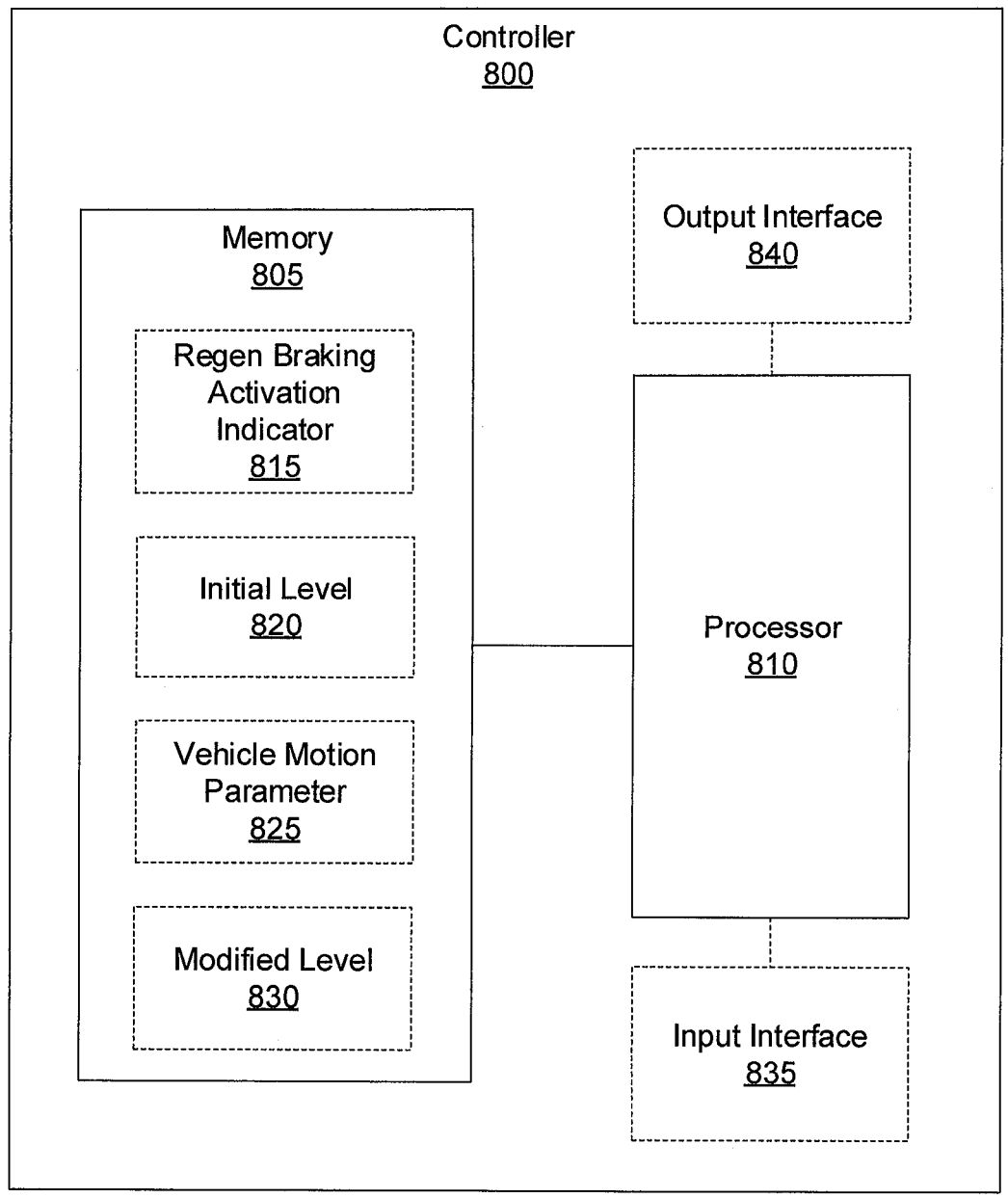
FIG. 8 shows a schematic block diagram of an example controller which may be used for controlling an electric vehicle, in accordance with a non-limiting implementation of the present specification.

Turning now to FIG. 8, a schematic representation is shown of an example controller 800 for controlling an electric vehicle. Controller 800 comprises a memory 805 to store instructions executable by a processor. Controller 800 also comprises a processor 810 in communication with memory 805. Controller 800 may have the features and perform the functions described in relation to method 100 and the other methods described herein.

Processor 810 may comprise a central processing unit (CPU), a graphics processing unit (GPU), a microcontroller, a microprocessor, a processing core, a field-programmable gate array (FPGA), or similar device capable of executing instructions. Processor 810 may cooperate with memory 805 to execute instructions.

Memory 805 may comprise a non-transitory machine-readable storage medium which may comprise an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

In some examples, memory 805 may store one or more of a regen braking activation indicator 815, an initial level 820 for regen braking, a vehicle motion parameter 825, and a modified level 830 for regen braking. In FIG. 8, regen braking activation indicator 815, initial level 820, vehicle motion parameter 825, and modified level 830 are shown in dashed lines to indicate that in some examples one or more of these entities need not be stored in memory 805. In some examples, the entities not stored in memory 805 may be stored elsewhere in controller 800, or outside of controller 800. Moreover, in some examples one or more of the entities not stored in memory 805 may be stored in transitory machine-readable memory as-needed during the operation of controller 800.

In addition, in some examples controller 800 may comprise an input interface 835. In some examples, controller 800 may receive via input interface 835 control inputs from the operator of the vehicle or the operator of a fleet of vehicles to which the vehicle belongs. In addition, in some examples controller 800 may receive via input interface 835 one or more of: regen activation indicator 815, vehicle motion parameter 825, roll back or traction loss indicators, a vehicle environment parameter, a mechanical braking level, and the like. In some examples, controller 800 may also receive other inputs via input interface 835. In FIG. 8 input interface 835 is depicted in dashed lines to signify that in some examples controller 800 need not comprise an input interface. In such examples the functions of the input interface may be performed by a different component of controller 800 or by an apparatus or system other than controller 800.

Moreover, in some examples controller 800 may also comprise an output interface 840. In some examples, controller 800 may communicate via output interface 840 with components in the electrical propulsion system of the electric vehicle to control or change the level of regen braking. For example, controller 800 may communicate via output interface 840 with one of more of the electric motor and the battery of the vehicle to control the level of regen braking. In addition, in some examples controller 800 may also communicate via output interface 840 with the mechanical braking system of the vehicle to adjust the level of mechanical braking of the vehicle. In some examples, output interface 840 may transmit electrical, optical, mechanical, or other types of control signals to the vehicle's electrical and mechanical components.

Furthermore, it is contemplated that in some examples controller 800 may display or otherwise provide information to the operator of vehicle or a fleet of vehicles to which the vehicle belongs. The information may be related to the settings and the operating parameters of the vehicle. In FIG. 8 output interface 840 is depicted in dashed lines to signify that in some examples controller 800 need not comprise an output interface. In such examples the functions of the output interface may be performed by a different component of controller 800 or by an apparatus or system other than controller 800.

It is also contemplated that in some examples controller 800 may comprise a housing (not shown) to which memory 805 and processor 810 may be directly or indirectly secured. In addition, in some examples input and output interfaces 835, 840 may also be secured to the housing.

Processor 810 may receive regen braking indicator 815, and if this indicator is affirmative, may control the electrical propulsion system of the vehicle to apply regen braking at an initial level 820 to an electric motor of the vehicle. In some examples, the electrical propulsion system may include the components that contribute to moving the vehicle using electrical energy. The electrical propulsion system may include one or more of an electric motor(s), battery(ies), controller(s), sensor(s), and the like. In this description controller 800 or its processor 810 controlling one or more components of the electrical propulsion system of the vehicle to apply regen braking or change the regen braking level may be described, in short form, as controller 800 or its processor 810 applying regen braking or changing the regen braking level.

Processor 810 may also obtain vehicle motion parameter 825 of the vehicle measured when the regen braking is being applied. In addition, processor 810 may change the regen braking to modified level 830 based on vehicle motion parameter 825.

In some examples, vehicle motion parameter 825 may comprise an acceleration of the vehicle. In such examples, processor 810 may obtain the acceleration, and change the regenerative braking to set the modified level to be greater than the initial level, if the acceleration is greater than an acceleration threshold.

Moreover, in some examples processor 810 may obtain the acceleration when the regenerative braking is being applied at the modified level. If the acceleration is greater than the acceleration threshold, processor 810 may change the regenerative braking to a further modified level being greater than the modified level. In some examples, if the acceleration is equal to or less than the acceleration threshold, processor 810 may change the regenerative braking back to the initial level.

In addition, in some examples vehicle motion parameter 825 may comprise a roll back indicator of the electric vehicle. Processor 810 may obtain the roll back indicator, and change the regen braking to set modified level 830 to a maximum regenerative braking level, if the roll back indicator is affirmative. Furthermore, in some examples vehicle motion parameter 825 may comprise a traction loss indicator of the electric vehicle. Processor 810 may obtain the traction loss indicator, and change the regen braking to set modified level 830 to be less than the initial level, if the traction loss indicator is affirmative.

In some examples, to obtain the traction loss indicator processor 810 may obtain a rotational speed of a rotor of the electric motor of the vehicle. Processor 810 may set the traction loss indictor to affirmative if the rotational speed is at or below a threshold speed, and set the traction loss indictor to negative if the rotational speed is above the threshold speed. Moreover, in some examples, to set the modified level to be less than the initial level processor 810 may set the modified level to zero by disabling the regenerative braking.

Furthermore, in some examples processor 810 may also obtain the traction loss indicator when the regenerative braking is being applied at the modified level. If the traction loss indicator is negative, processor 810 may change the regenerative braking to a further modified level being greater than the modified level.

In addition, in some examples processor 810 may also receive from a sensor a vehicle environment parameter of the electric vehicle, and change the regenerative braking to the modified level based further on the vehicle environment parameter. Moreover, in some examples processor 810 may receive a mechanical braking parameter of the electric vehicle. Processor 810 may then change the regenerative braking to the modified level based further on the mechanical braking parameter. Processor 810 may also change a mechanical braking level of the electric vehicle based on the change of the regenerative braking to the modified level.

Figure 9:
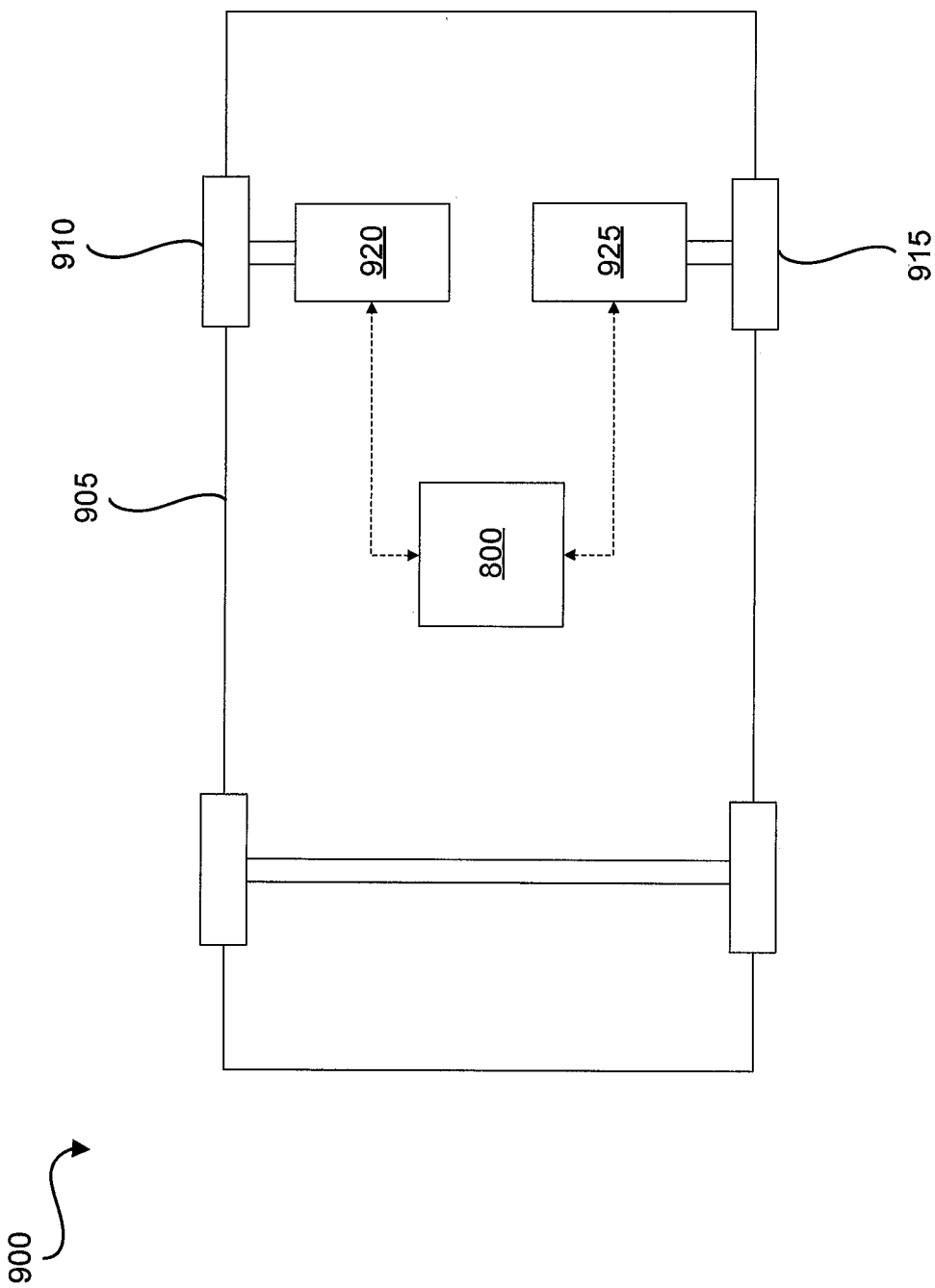
FIG. 9 shows a partial schematic representation of an example electric vehicle, in accordance with a non-limiting implementation of the present specification.

Turning now to FIG. 9, a partial schematic representation is shown of an example electric vehicle 900. Vehicle 900 may comprise a chassis 905 and four wheels. Each of the rear wheels 910 and 915 may be mechanically coupled to a corresponding electric motor 920 and 925. Controller 800 may be onboard vehicle 900, and in communication with motors 920 and 925.

It is contemplated that in some examples, each motor may have its own corresponding controller. In addition, it is contemplated that in some examples each of the four wheels may be coupled to its own corresponding electric motor. Each of these four motors may in turn be controlled by a central controller or by a motor-specific controller similar to controller 800. In addition, in some examples the vehicle may be front wheel drive.

Figure 10:
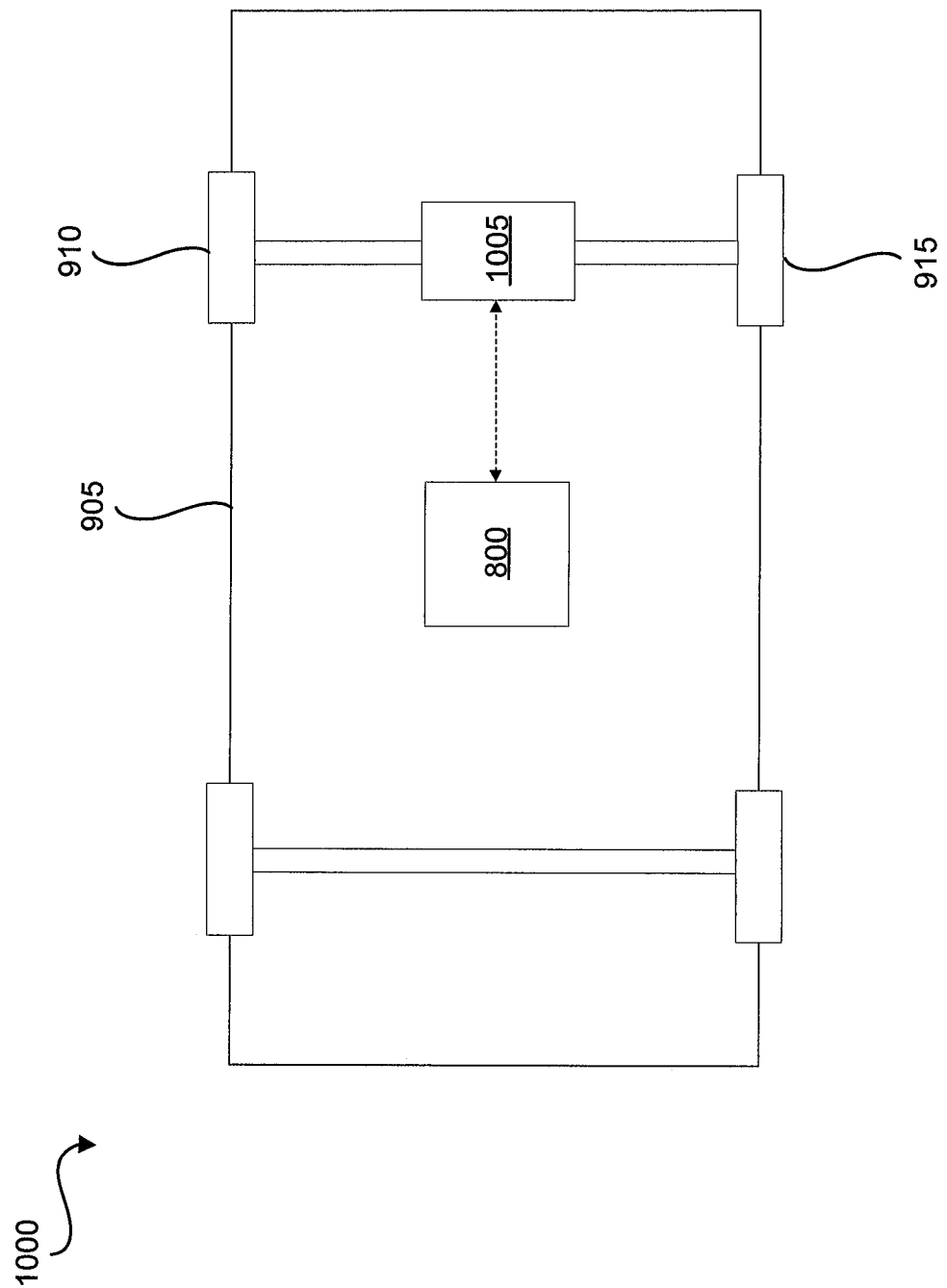
FIG. 10 shows a partial schematic representation of another example electric vehicle, in accordance with a non-limiting implementation of the present specification.

FIG. 10, in turn, shows a partial schematic representation of an example electric vehicle 1000. Vehicle 1000 may be similar to vehicle 900, with a difference being that vehicle 1000 comprises one electric motor 1005 to drive both rear wheels 910 and 915. Motor 1005 may be in communication with and controlled by controller 800. In some examples, vehicles 900 and 1000 may comprise electric cars, trucks, golf carts, go carts, lift trucks, riding lawn mowers, and the like. In addition, it is contemplated that in some examples vehicle 1000 may be front wheel drive.

Figure 11:
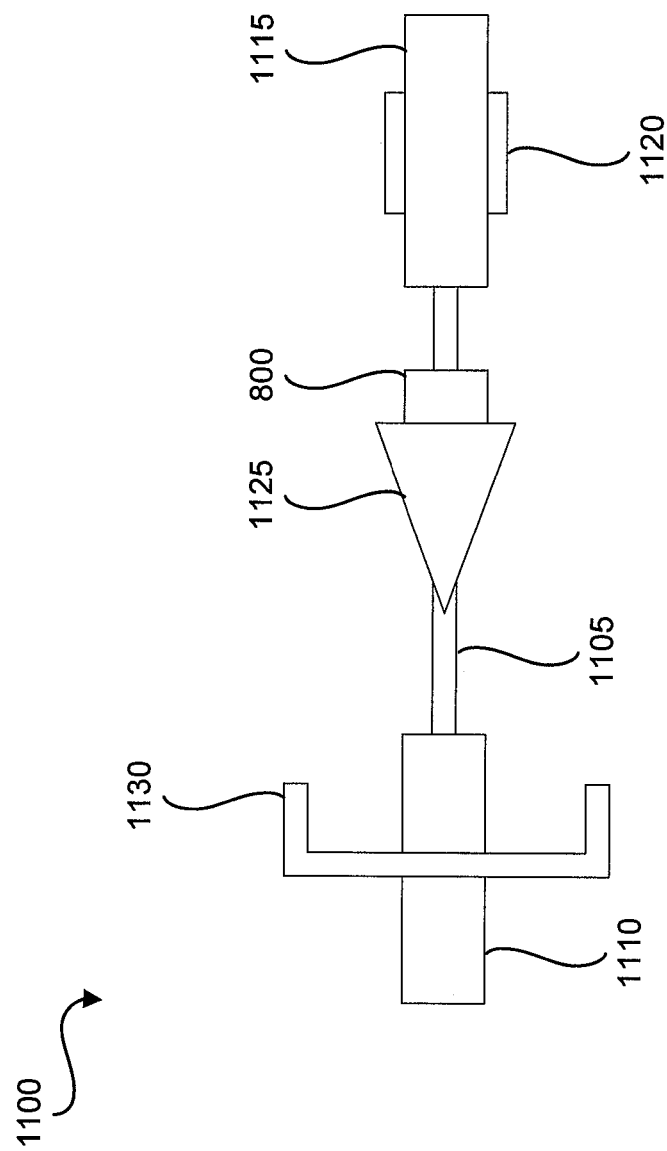
FIG. 11 shows a partial schematic representation of yet another example electric vehicle, in accordance with a non-limiting implementation of the present specification.

Turning now to FIG. 11, a partial schematic representation is shown of an example electric vehicle 1100. Vehicle 1100 comprise a frame 1105, a front wheel 1110, and a rear wheel 1115. In other words, vehicle 1100 is a two-wheeled vehicle. An electric motor 1120 may be mechanically coupled to rear wheel 1115. Motor 1120 may comprise an in-hub or in-wheel electric motor. It is contemplated that other types, numbers, and placements of electric motors may also be used. In addition, in some examples the electric motor may be coupled to one or both of the wheels using other types of mechanical couplings, such as direct drives, chain drives, shaft drives, transmissions, gear boxes, and the like.

Motor 1120 may be in communication with and controlled by controller 800. Vehicle 1100 also comprises a saddle 1125 and handlebars 1130. While FIG. 11 shows controller 800 as being located behind saddle 1125, it is contemplated that in some examples controller 800 may be located at a different part of vehicle 1100. In some examples, vehicle 1100 may comprise an electric bicycle, electric motorcycle, electric scooter, electric moped, and the like.

It is also contemplated that the methods and controllers described herein may be used in vehicles and vehicle configurations other than those described in relation to FIGS. 9-11. In addition, it is contemplated that method 100 and the other methods described herein may be performed by controller 800 and the other controllers described herein. In addition, it is contemplated that method 100 and the other methods described herein may also be performed by apparatuses and systems other than the controllers described herein. Furthermore, it is contemplated that controller 800 and the other controllers described herein may perform method 100 and the other methods described herein. It is also contemplated that controller 800 and the other controllers described herein may have features or perform functions other than those described in relation to method 100 and the other methods described herein.

It is also contemplated that in some examples, method 100 and the other methods described herein may be stored in non-transitory computer-readable storage media as machine-readable or computer-readable instructions. Such instructions, upon execution by a processor, may cause the processor to perform method 100 and the other methods described herein.

It should be recognized that features and aspects of the various examples provided herein may be combined into further examples that also fall within the scope of the present disclosure.

The invention claimed is:

1. A method for controlling an electric vehicle, the method comprising:
   receiving a regenerative braking activation indicator;
   if the regenerative braking activation indicator is affirmative, applying regenerative braking at an initial level to an electric motor of the electric vehicle;
   obtaining a vehicle motion parameter of the electric vehicle measured when the regenerative braking is being applied;
   changing the regenerative braking to a modified level in response to the vehicle motion parameter;
   obtaining a corresponding vehicle motion parameter when the regenerative braking is being applied at the modified level;
   if the corresponding vehicle motion parameter is greater than a vehicle motion parameter threshold, changing the regenerative braking to a further modified level; and
   if the corresponding vehicle motion parameter is equal to or less than the vehicle motion parameter threshold, changing the regenerative braking to the initial level.

2. The method of claim 1, wherein:
   the vehicle motion parameter comprises an acceleration of the electric vehicle, the corresponding vehicle motion parameter comprises a corresponding acceleration of the electric vehicle, and the vehicle motion parameter threshold comprises an acceleration threshold;
   the obtaining the vehicle motion parameter and the corresponding vehicle motion parameter comprise obtaining the acceleration and the corresponding acceleration respectively; and
   the changing the regenerative braking comprises setting the modified level to be greater than the initial level if the acceleration is greater than the acceleration threshold.

3. The method of claim 2, wherein:
   the changing the regenerative braking to the further modified level comprises: if the corresponding acceleration is greater than the acceleration threshold, changing the regenerative braking to the further modified level being greater than the modified level.

4. The method of claim 1, further comprising:
   receiving from a sensor a vehicle environment parameter of the electric vehicle; and
   changing the regenerative braking to the modified level based further on the vehicle environment parameter.

5. The method of claim 1, further comprising:
   receiving a mechanical braking parameter of the electric vehicle; and
   one or more of:
   changing the regenerative braking to the modified level based further on the mechanical braking parameter; and
   changing a mechanical braking level of the electric vehicle based on the changing the regenerative braking to the modified level.

6. A controller for controlling an electric vehicle, the controller comprising:
   a memory to store instructions executable by a processor; and
   the processor in communication with the memory, the processor to:
   receive a regenerative braking activation indicator;
   if the regenerative braking activation indicator is affirmative, apply regenerative braking at an initial level to an electric motor of the electric vehicle;
   obtain a vehicle motion parameter of the electric vehicle measured when the regenerative braking is being applied;
   change the regenerative braking to a modified level in response to the vehicle motion parameter;
   obtain a corresponding vehicle motion parameter when the regenerative braking is being applied at the modified level;
   if the corresponding vehicle motion parameter is greater than a vehicle motion parameter threshold, change the regenerative braking to a further modified level; and if the corresponding vehicle motion parameter is equal to or less than the vehicle motion parameter threshold, change the regenerative braking to the initial level.

7. The controller of claim 6, wherein:

the vehicle motion parameter comprises an acceleration of the electric vehicle, the corresponding vehicle motion parameter comprises a corresponding acceleration of the electric vehicle, and the vehicle motion parameter threshold comprises an acceleration threshold;

to obtain the vehicle motion parameter and the corresponding vehicle motion parameter the processor is to obtain the acceleration and the corresponding acceleration respectively; and to change the regenerative braking the processor is to set the modified level to be greater than the initial level if the acceleration is greater than the acceleration threshold.

8. The controller of claim 7, wherein:

to change the regenerative braking to the further modified level the processor is to: if the corresponding acceleration is greater than the acceleration threshold, change the regenerative braking to the further modified level being greater than the modified level.

9. The controller of claim 6, wherein the processor is further to:

receive from a sensor a vehicle environment parameter of the electric vehicle; and change the regenerative braking to the modified level based further on the vehicle environment parameter.

10. The controller of claim 6, wherein the processor is further to:

receive a mechanical braking parameter of the electric vehicle; and one or more of:

change the regenerative braking to the modified level based further on the mechanical braking parameter; and change a mechanical braking level of the electric vehicle based on the change of the regenerative braking to the modified level.

* * * * *